Nov. 3, 1964 J. A. CHASE 3,154,975

APPARATUS FOR POINTING AND SEVERING WIRES OR PINS

Filed Jan. 26, 1961 2 Sheets-Sheet 1

INVENTOR.
JOHN A. CHASE
BY
William A. Zalesak
Attorney

APPARATUS FOR POINTING AND SEVERING WIRES OR PINS

Filed Jan. 26, 1961

2 Sheets-Sheet 2

INVENTOR.
JOHN A. CHASE
BY
William A. Zalesak
Attorney

United States Patent Office 3,154,975
Patented Nov. 3, 1964

3,154,975

APPARATUS FOR POINTING AND SEVERING WIRES OR PINS

John Anthony Chase, Nutley, N.J., assignor to Radio Corporation of America, a corporation of Delaware Filed Jan. 26, 1961, Ser. No. 85,014
6 Claims. (Cl. 78—1)

This invention relates to an apparatus for pointing and severing wires or rods. The invention is particularly valuable for forming and severing vacuum tube support and lead-in conductors to provide pointed ends thereon of frustro-conical shape.

In one type of vacuum tube, the tube electrodes are mounted on flanges which, in turn, are mounted on support rods or conductors extending from a ceramic wafer or header member. Usually three support conductors or rods are provided for each tube element and of these three support rods one also acts as the lead-in connection. Two conductors are used both to support and to provide lead-ins for the cathode heater. The lead-in conductors extend sufficiently beyond the wafer so that they may be inserted into a socket provided for the vacuum tube. The envelope of the tube is secured vacuum tight to the wafer.

The wafer is very small, being about .400 (approximately 13/32) of an inch in diameter. In the completed vacuum tube, the support and lead-in conductors must be sealed vacuum tight in the wafer. For this purpose, the walls of the holes through the wafer through which the support and lead-in conductors extend are metallized and the rods are brazed to the metal inside the holes. The holes in the wafer thus must fit the rods so closely as to present a vacuum-tight joint after brazing. Fitting the supporting and lead-in members in the holes in the wafer has been a difficult, time-consuming job.

The lead wires or conductors are made from a continuous wire of molybdenum and are cut to the desired lengths. The cutting operation usually leaves a burr at the cut surface. The burr makes it difficult to push the lead wire into and through the holes in the wafer as well as adversely affecting brazing operations. Also, after the vacuum tube is completed, the burrs on the ends of the lead wires make it difficult to insert the tube in its socket upon later use of the tube. Because of the hardness of the molybdenum, undesirable wear results upon insertion of the lead wires into the corresponding holes in the socket, and after a relatively few insertions of the tube into its socket, the contacts of the socket are badly worn by the burrs on the lead wires which cut away the metal from the tube socket contacts. When the wires or conductors are pointed, the fitting of the wires or conductors into the wafer during tube manufacture is easier and socket wear due to the insertion of the tube into its socket during tube use is minimized. However, the tube leads are short, being less than about ½ inch long, and they are of small diameter, the diameter thereof being about .016 of an inch. Therefore, manual sharpening or removing of the burrs from such short fine conductors is not practical.

It is therefore an object of this invention to provide an apparatus for forming and severing wire or conducting rods of small diameter.

It is another object of this invention to provide an apparatus for cutting small diameter wire or conducting rods and pointing the ends of the wire or conducting rods prior to severing the wire.

It is also an object of this invention to provide an apparatus for severing lead and support wires or conductors and forming the severed ends into frusto-conical shape.

Apparatus made according to this invention includes a cutter assembly mounted on a frame by means of a clamp.

This cutter assembly comprises a housing in which are mounted a pair of disk-like forming and cutting dies having cutting surfaces in contact with each other. One of the dies is fixed in the housing and the other is slidable with respect to the fixed die. The dies have registering bores extending therethrough through which the conductors to be formed and cut are extended. A rotatable spindle mounted within the housing is provided with a cup-shape means mounted eccentrically with respect to the longitudinal axis of the spindle. The cup-shape member engages a movable die holding member in which the slidable die is fixed. The spindle can be moved longitudinally of the housing to force the cup-shaped member against the die holding member. The spindle is provided at one end with a pulley coupled to a driving motor also mounted on the frame. A member pivoted to the frame is also connected to the spindle for causing longitudinal movement thereof during operation of the apparatus. As the spindle is rotated, the slidable or movable die is caused to move in such manner that its axis follows a spiral path, to form and sever conductors which are fed through the registering bores in the dies.

This invention will be described in detail in connection with the accompanying drawing in which.

Figure 1:
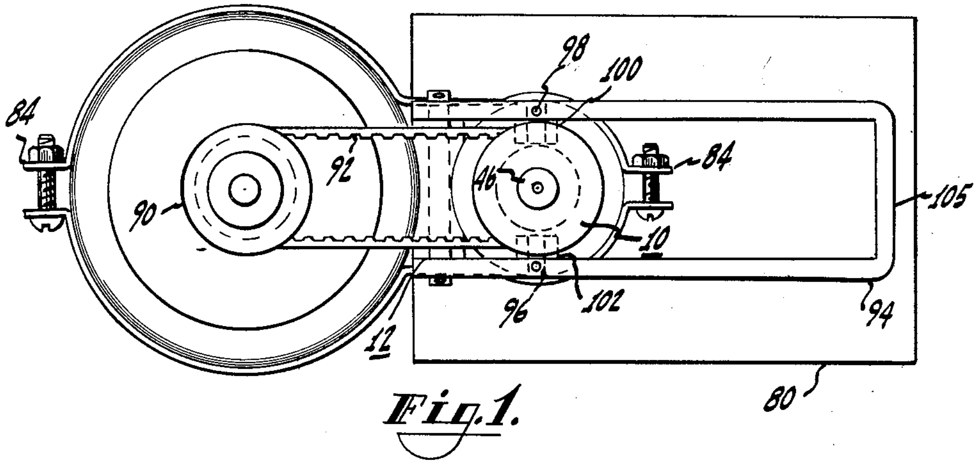
FIG. 1 is a plan view of the device of this invention.
Figure 2:
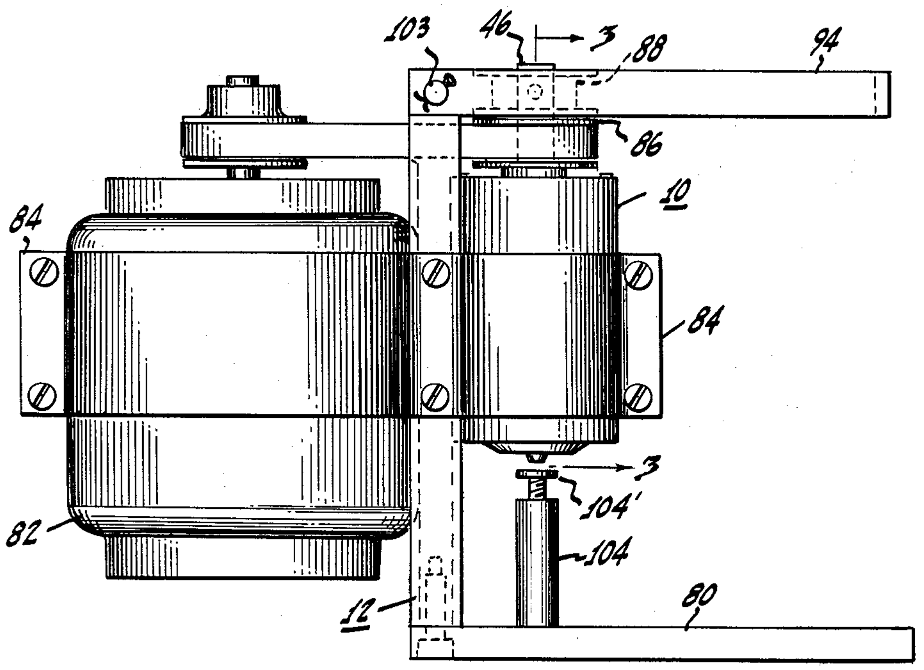
FIG. 2 is a side elevation thereof.

FIGS. 1 and 2 illustrate the mounting means of this apparatus. A support 12 is secured to the base 80. A motor 82 is mounted on one side of the support 12 by bracket 84 which also holds the cutter assembly 10 on the other side of the support 12. Two pulleys 86 and 88 are mounted on a rotatable shaft 46, which extends from the top of the cutter assembly 10. A pulley 90 is mounted on the shaft of the motor 82 and a belt 92 couples pulleys 90 and 86. The motor 82, during operation of this device, rotates continually.

A U-shaped lever 94 is pivoted on the upper end of support 12 at 103 and surrounds the upper pulley 88. Stub axles 96 and 98 extend from the U-shaped lever 94 towards the axis of the pulley 88 and rollers 100 and 102 are mounted on the stub axles 96 and 98 and are positioned between the flanges of the upper pulley 88. The lever is pivoted at the end 103 remote from its handle end. At the handle end, the cross-piece 105 connects the parallel members of the U-shaped frame. When the lever 94, which is a lever of the second class, is pressed down, the rotary shaft 46 and all parts mounted thereon are forced downwardly. A member 104 on base 10 supports the adjustable stop 104′ threadedly mounted in the support 104. The position of the stop 104′ determines the length of the cut-off portion of the wire.

Figure 3:
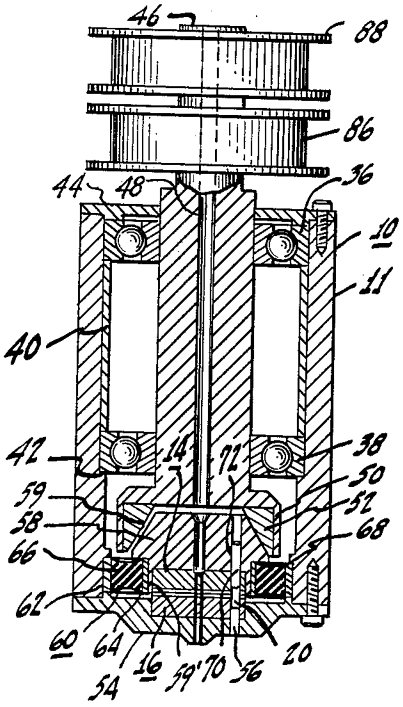
FIG. 3 is a section of FIG. 2 on line 3—3 thereof.

The cutter assembly 10 which is shown in FIG. 3 comprises a pair of cutting dies, such as are described above, means for holding one die in a fixed position and means for sliding the other cutting dies across the first. The cutting dies are held with the cutting faces in contact as better shown in FIG. 5.

The cutter assembly shown in section in FIG. 3 comprises a cylindrical housing 11 in which the shaft 46 is rotatably supported in ball bearing assemblies 36 and 38. The bearing 36 and 38 are spaced by the spacer member 40. The housing is closed at one end by a cover plate 44 which retains the ball bearings 36 and 38 and spacer member 40 fixed against a shoulder 42 of the housing. This shaft 46 has central bore 48 therethrough and is longitudinally slidable with respect to the housing in bearings 36 and 38. One end of the spindle is inside the housing 11 and is provided with a cup-shaped member 50 in which is mounted a cylindrical wear block 52 having a frustroconical hole therethrough. The cup-shaped member 50 is mounted eccentrically of the longitudinal axis of the spindle 46, the eccentricity of this mounting being greatly exaggerated in the drawing.

A pair of cutting and forming dies 14 and 16 are mounted at the other end of the housing which is closed by another cover plate 54. The die 16 is fixed in the other cover plate 54 by means of an off-center pin 56 extending axially through the cover plate 54 and the die 16. The die 14 is slidably mounted in contacting relationship with the die 16. The die 14 is supported within a wire locator and die holder 58 and is fixed thereto by means of a pin 70. The die holder 58 is provided with a frustoconical exterior portion 59 which is engaged by interior frustroconical portion of the wear block 52. The die holder 58 is resiliently constrained by means of the die centering assembly 60 comprising the respectively exterior and interior annular collar-like members 62 and 64 between and to which an annular resilient member 66, preferably of rubber, is vulcanized. The exterior collar-like member 62 of the die centering assembly 60 is clamped within the housing 11 between the lower closure plate 54 and a shoulder 68 near the lower end of the housing. The wire locator and die holder 58 has a lip 59 press-fitted within the inner annular collar-like member 64 of the die centering assembly 60 whereby the die centering assembly is substantially prevented from turning with respect to the housing 11, and the two dies 14 and 16 are normally held with their cutting faces in contact and with the wire receiving and forming holes or bores in registery. Since the cup-shaped member 50 is eccentrically mounted, as the spindle 46 is rotated, the die 14 will move in such a manner that the holes or bores therein through which the leads or conductors are directed will follow spiral paths relative to the bores in the fixed die. As will be described in more detail below, this relative movement of the two dies causes severing of conductors as well as forming frustroconical ends.

Figure 4:
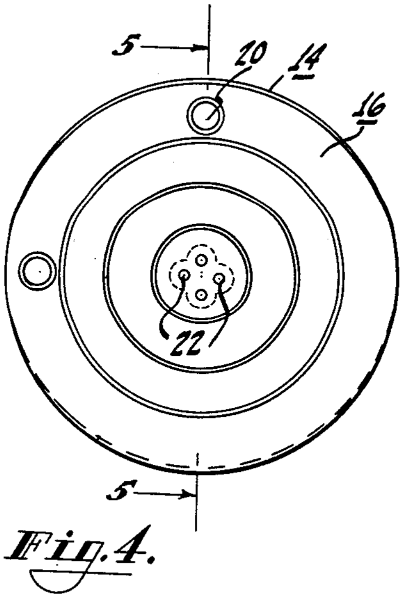
FIG. 4 is an enlarged plan view of the dies of this invention.
Figure 5:
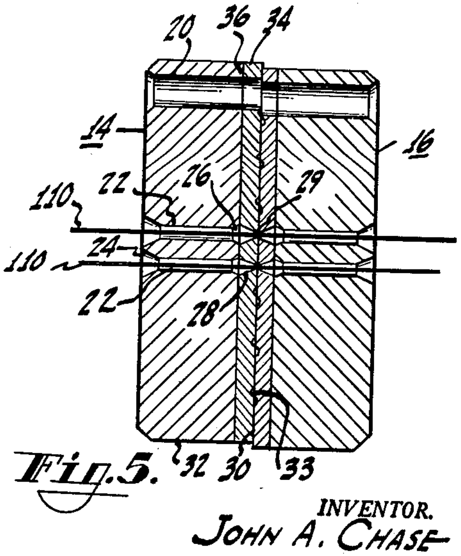
FIG. 5 is a cross-sectional view of the two dies of this invention, taken on line 5—5 of FIG. 4 showing a relative position that they occupy during the operation of this device; and, FIG. 6 is a view of a wire or rod in which the end has been cut using the method or apparatus of this invention.

The dies are shown in FIGS. 4 and 5. The upper and lower dies 14 and 16 are identical and so only one thereof is described in detail. The upper die 14 has a locating hole 20 therethrough. One end of the locating hole 20 is funnel shaped to facilitate insertion of a locating pin 56 mentioned above. Four wire receiving holes are shown in the die 14, the wire receiving holes 22 being arranged symmetrically around and parallel to the axis of the die. The wire receiving holes 22 have funnel shaped ends 24 at the wire receiving surface of the die opposite the contacting surface to guide and to provide for easy insertion of the wires. The other ends of the holes 22 have two frustoconical portions 26 and 28 in axial alignment with the base portions thereof of the same diameter and in coincidence. One frustoconical portion terminates at the apex end in coincidence with the constant diameter bore portion of the wire receiving hole and in axial alignment therewith. Hence the other frustoconical portion terminates with its apex end at the cutting, contacting face of the die 14. Thereby, a sharp edge or cutting circle 29 is provided around the periphery of the hole at the other or wire cutting surface of the die. To make the double frustoconical formation 26 and 28, the die may be made in two parts 32 and 34. The thicker part 32 may be of air hardened tool steel having the funnel openings 24 and 26 of the wire receiving holes 22 at opposite sides thereof. A thin disk 34, which may be of a very hard alloy of tungsten carbide and cobalt such as sold under the name "Carboloy," and which has the frustoconical holes 28 therein is silver soldered, with the holes 28 fitting and in registry with the funnel shaped holes 26, to the tool steel portion 32 of the die, at the interface 36 with the smaller opening of the frustoconical portion 28 at the planar cutting face of the die in the direction away from the thicker portion 32. The pin locating hole 20 for locating the die in its holder extends through both the steel 32 and the "Carboloy" disk 34 parts of the die 14. In this manner, a cutting die is provided in which the cutting holes 22 have a double frustoconical shape 26 and 28 at the cutting portion thereof terminating in circular cutting edges 29 in the cutting surface of the die. However, if desired, the frustoconical hole 26 may be omitted whereby the bore 22 continues at constant diameter until it communicates with the frustoconical hole 28.

Concentric circular grooves 33 are provided in the cutting face of the dies. These grooves function as oil grooves and to store whatever metal particles that break oc the wires being severed between cleanings of this device.

Figure 6:
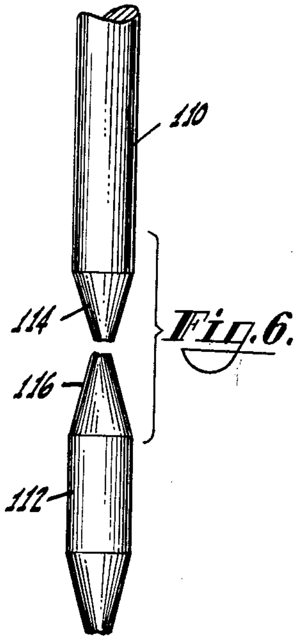

In operation, wires to be cut and formed as those shown in FIG. 6 are inserted through central hole 48 in shaft 46 and into one or more of the off-set cutting holes 22 in both dies 14 and 16 until the wires hit the stop 104'. The hole 48 is large enough in diameter to surround all four cutting holes 22 and the wires 110 may easily be vibrated into cutting holes 22. FIG. 5 illustrates the position of wires 110 with respect to the dies at a point in the operation of this device before the wires 110 are cut. While the motor is running, the lever 94 is pressed down and the upper die 14 thereby is moved in an increasing spiral. These wires 110 are now sheared by a shearing force of the cutting edges 29 of the dies 14 and 16 that is always directed radially of the wire, producing frustoconical portions 114 and 116, as shown in FIG. 6, in the severed ends of the wire. The degree of sharpness of the wire when it breaks depends on the material thereof. Therefore, the wire, when it breaks may be sharper or duller than is shown in FIG. 6. While perfect conical frustra are not produced by this apparatus and method, pointed ends are produced on the wires at severing thereof which are substantially frustroconical in shape.

While it is clear that more or less cutting holes may be provided through the dies 14 and 16, four wire cutting holes are shown therein in FIG. 4. If only one centrally located cutting hole is provided at each of the dies, it is not necessary to prevent the dies from rotating with respect to each other since with only one hole so placed, a radially inward cutting force of ever varying direction will result whether the dies rotate about their axes or not. However, where one or more off-center cutting holes are provided in the dies, as here shown and described, the dies are arranged to be substantially rotationless with respect to each other, with one die having a kind of revolving, but not rotating, motion with respect to the other. Hence, the shear forces are still directed substantially radially for wires in each of the multiple holes in the dies, that is, always towards the center of each wire and always at different points around the circumference of each wire.

What is claimed is:

1. Apparatus for pointing and cutting a wire comprising a pair of dies having respective surfaces in contacting face-to-face relation, a wire receiving bore in each die, said bores being normally in registry, said bores being of smaller diameter at the contacting surfaces of said dies and increasing in diameter away from said contacting surfaces to form tapered walls, the edges of said bores in said contacting surfaces being wire cutting means, and the tapered walls of said bores being wire pointing means, and means for moving one die with respect to the other in a spiral of increasing radius while maintaining the faces of the said dies in contact for causing said bore edges to cut a wire extending through said bores, and for causing said tapered walls to point each end of said cut wire.

2. Apparatus for pointing and cutting a wire comprising a housing, a die fixedly mounted in said housing, a second die resiliently mounted in said housing, said dies being in slidable contact, a holder for said second die, a shaft rotatably and slidably mounted in said housing, a cup-like extension having a conical bore and a conical extension eccentrically mounted one with respect to the other on said die holder and on said shaft, the smallest lateral extent of said conical extension being smaller than the largest lateral extent of said conical cup, means for rotating said shaft and means for sliding said shaft.

3. An apparatus for pointing and cutting a wire comprising the housing, a die fixed in said housing, a second die in contact with said first die in said housing, a holder for said second die, a slidable shaft mounted for rotation in said housing, means connected to said shaft, said means having a conical depression in the end thereof, a conical projection on the end of said die holder, the smallest diameter of said conical projection being smaller than the largest end of said conical shaped depression, one of said depression and said projection being eccentrically positioned with respect to the axis of said shaft, means to rotate said shaft and means to slide said shaft in an axial direction.

4. Apparatus for forming and severing a conductor to provide a conductor with a frustroconical end, said apapparatus including a housing, a pair of disk-like dies in said housing having oppositely disposed flat surfaces in contact with each other, said dies being provided with registering bores extending therethrough normal to said flat surfaces for receiving a conductor to be formed and severed, one of said dies being fixed in said housing and the other of said dies being slidable with respect to said one die, and means within said housing and connected to said slidable die for causing said bores within said slidable die to follow a spiral path with respect to the registering bores in the fixed die, said bores including portions of frustroconical shape, the smaller diameter portions of the frustroconical bores lying in the flat surfaces of said dies, the edges of said bores in said flat surfaces being wire cutting means, and the frustroconical walls of said bores being wire pointing means, whereby upon spiral movement of said bores, a wire extending through said registering bores is cut through by said edges, and each end of said cut wire is pointed by said walls.

5. Apparatus for forming and severing a conductor to provide a conductor with a frustroconical end, said apparatus including a housing, a pair of disk-like dies in said housing having oppositely disposed flat surfaces in contact with each other, said dies being provided with registering bores extending therethrough normal to said flat surfaces for receiving a conductor to be formed and severed, one of said dies being fixed in said housing and the other of said dies being slidable with respect to said one die, and rotatable means within said housing and having an eccentric coupling with said slidable die for causing said bores within said slidable die to follow a spiral path with respect to the registering bores in the fixed die, said bores including portions of frustroconical shape, the smaller diameter portions of the frustroconical bores lying in the flat surfaces of said dies, the edges of said bores in said flat surfaces being wire cutting means, and the frustroconical walls of said bores being wire pointing means, whereby upon spiral movement of said bores, a wire extending through said registering bores is cut through by said edges, and each end of said cut wire is pointed by said walls.

6. Apparatus for pointing and cutting a wire comprising a housing, a die fixedly mounted in said housing, a second die resiliently mounted for movement within said housing, said dies having face-to-face contact, there being a wire receiving bore through each of said dies, said bores being of relatively small diameter at the contacting surfaces of said dies and increasing in diameter away from said contacting surfaces, and means for moving said resiliently mounted die with respect to said fixedly mounted die in a spiral of increasing radius, the edges of said bores at said contacting surfaces being wire cutting means, and the tapered walls of said bores being wire pointing means, whereby upon spiral movement of said slidable die a wire extending through said bores is cut through by said edges, and each end of said cut wire is pointed by said walls.

References Cited in the file of this patent

UNITED STATES PATENTS

| | | |
|---|---|---|
| 15,905 | Tuttle | Oct. 14, 1856 |
| 315,395 | Dupont | Apr. 7, 1885 |
| 740,492 | Veeder | Oct. 6, 1903 |
| 2,057,580 | Layton | Oct. 13, 1936 |
| 2,428,650 | Brunner | Oct. 7, 1947 |
| 2,794,303 | Wickes | June 4, 1957 |
| 2,863,342 | Appel | Dec. 9, 1958 |

FOREIGN PATENTS

| | | |
|---|---|---|
| 1,091,453 | Germany | Oct. 20, 1960 |